June 14, 1966 N. LAING 3,255,957
ROTOR DRIVE MECHANISM
Filed Aug. 3, 1965 3 Sheets-Sheet 1

INVENTOR
Nikolaus Laing
ATTORNEYS

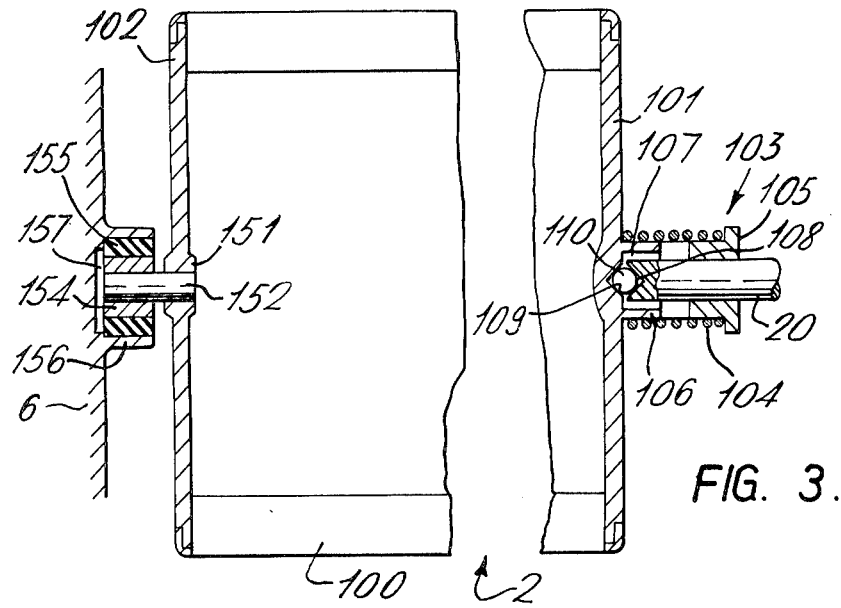
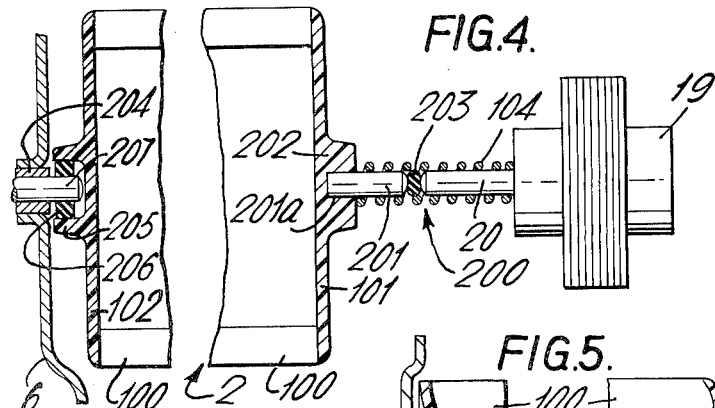
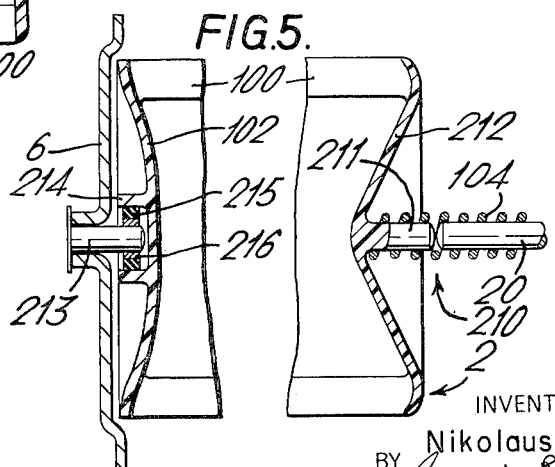

June 14, 1966  N. LAING  3,255,957
ROTOR DRIVE MECHANISM
Filed Aug. 3, 1965  3 Sheets-Sheet 3
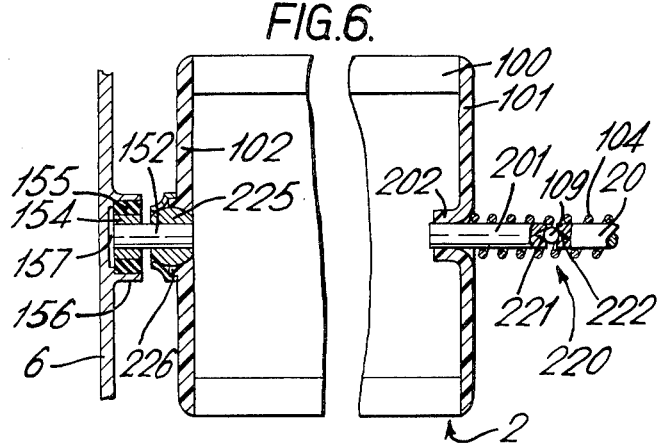
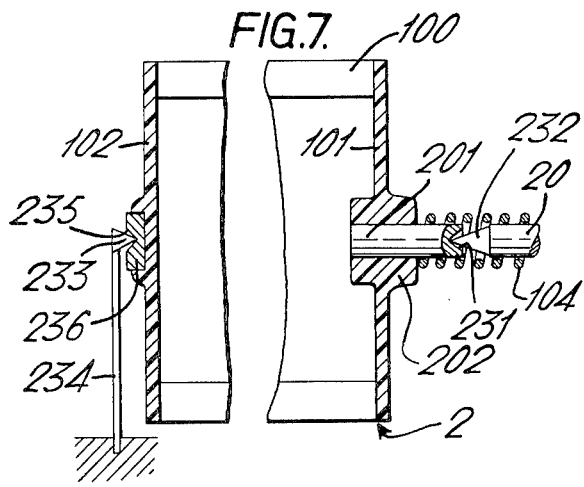
INVENTOR
Nikolaus Laing
BY
ATTORNEYS

United States Patent Office

3,255,957
Patented June 14, 1966

3,255,957
ROTOR DRIVE MECHANISM
Nikolaus Laing, 7141 Aldingen B, Stuttgart, Germany
Filed Aug. 3, 1965, Ser. No. 476,892
Claims priority, application Germany, Feb. 15, 1960,
L 35,371
11 Claims. (Cl. 230—125)

This invention relates to fluid flow machines of the cross-flow type: this application is a continuation in part of my copending application Serial No. 89,547 filed February 15, 1961, now Patent No. 3,199,179.

A fluid flow machine of the cross flow type is understood herein to comprise a cylindrical bladed rotor and guide means cooperating therewith on rotation of the rotor in a predetermined direction to induce a flow of fluid from a suction side of the rotor through the path of the rotating blades to the interior of the rotor and thence again through the path of the rotating blades to a pressure side of the rotor.

Examples of cross-flow fluid machines may be found in United States Patent 2,942,773 and British Patent 876,611.

Though in certain cases it is required that a proportion of the total flow should enter the rotor through one or both ends, in general in a cross flow fluid machine flow takes place in planes transverse to the rotor axis, and means are provided to prevent any substantial amount of endwise flow into the rotor. Because of the way in which flow takes place there is no theoretical limit on the length of a rotor for a cross flow machine. When the rotor exceeds a certain length it cannot be overhung on a drive shaft like a centrifugal fan motor and must be rotatably mounted at both ends. For optimum performance no central shaft through the rotor can be tolerated.

Small cross-flow fans are commonly used as items of domestic equipment, or are incorporated in such equipment. Such fans have to be designed for economic quantity production and this calls for generous tolerances and light construction which militates against rigidity. For these conditions I have proposed, in my application Serial No. 423,454 filed January 5, 1965, (a continuation of application Serial No. 853,596 filed November 17, 1959), where the problems involved are more fully discussed, that a relatively long rotor should have one end mounted upon a drive shaft by flexible means which provide both support for the rotor and drive thereto while permitting limited universal movement of the rotor relative to the shaft, and that the other end of the rotor should be journal-mounted to a fixed part with the interposition of flexible means which accommodate minor misalignment of the rotor axis, the flexible means in each case imposing only slight braking torque on the drive.

The present invention is specifically concerned with a cross-flow machine having a relatively long rotor supported at both ends as just described, and provides an improved means for connecting the rotor to the drive shaft. The connection means according to the invention comprises a stub extending axially from said one end of the rotor and a coil spring frictionally embracing both the stub and the drive shaft. The spring may in fact embrace a sleeve, collar or the like fast on the drive shaft and providing in effect an extension thereof. In such an arrangement the spring will herein still be regarded as embracing the drive shaft. Preferably to avoid squeaking or other noise there is interposed between the ends of the stub and drive shaft, and supported by the spring, a disc of anti-friction material such as tetrafluoroethylene (e.g. the material known under the trade name Teflon), or rubber, or other hard wearing material. Alternatively the stub may be recessed to recieve the end of the drive shaft, the stub and shaft being urged towards one another by the spring to grip a ball bearing between the bottom of the recess and the end of the drive shaft, to locate the rotor end radially and axially without imposing substantial braking torque. The rotor end member carrying the stub may be inwardly dished to accommodate wholly or partially the axial length of the stub.

Embodiments of the invention will now be described by way of example with reference to the accompanying drawings, in which:

FIGURE 3 is a longitudinal section, partly cut away, of a rotor, motor shaft and certain supporting parts of a cross-flow fan such as shown in FIGURES 1 and 2, showing one preferred way of connecting the rotor to a drive shaft so that the shaft both supports and drives the rotor with the connecting means accommodating minor misalignments;

FIGURES 4, 5, 6 and 7 are each a longitudinal sectional view similar to that of FIGURE 3 and showing a rotor such as might be used in the cross-flow fan of FIGURES 1 and 2, the various figures illustrating further ways according to the invention of connecting the rotor to a drive shaft.

Figure 1:
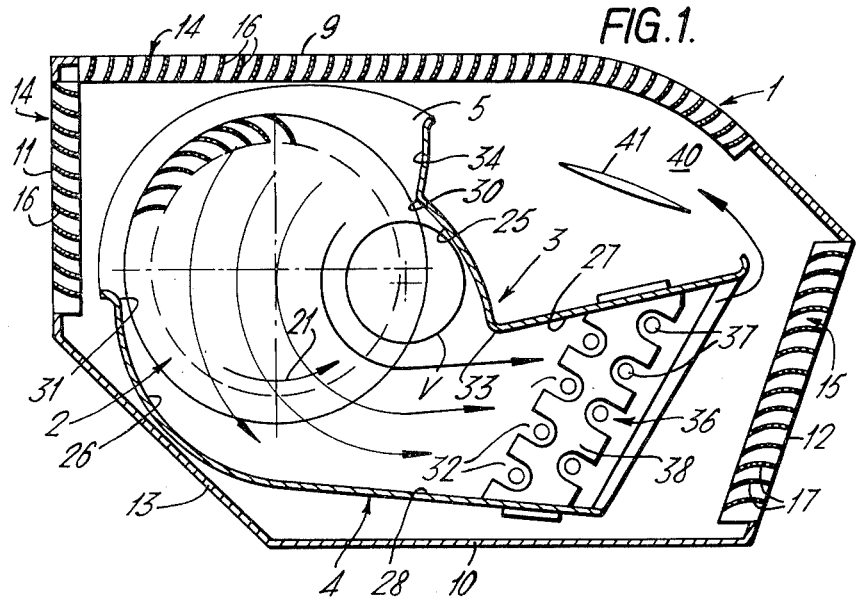
FIGURE 1 is a transverse section of a fan heater showing one form of cross-flow fan in which the invention may be incorporated.
Figure 2:
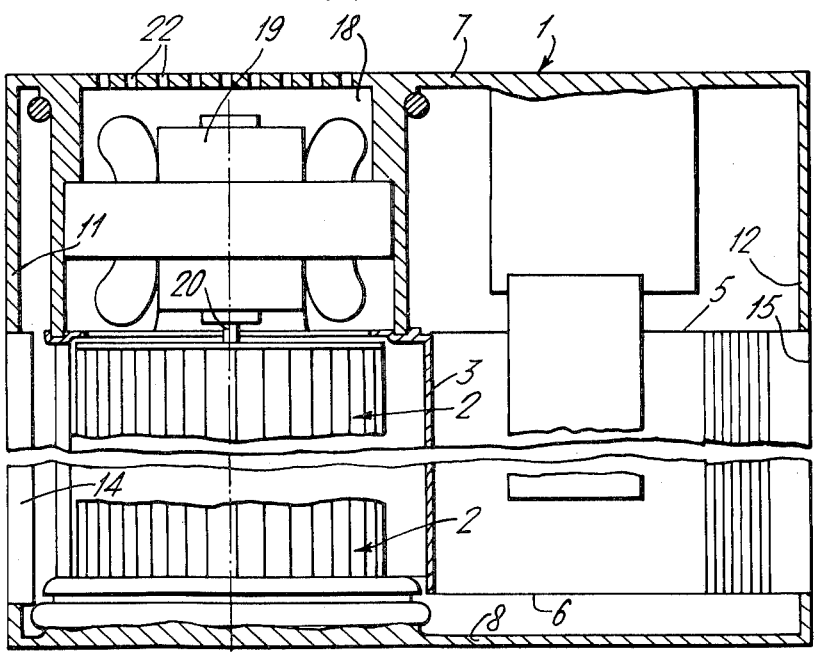
FIGURE 2 is a longitudinal section, partly cut away, of the FIGURE 1 fan heater.

Referring to the drawings, the fan heater illustrated in FIGURES 1 and 2 thereof comprises a casing 1 enclosing a cross-flow fan unit comprising a rotatably mounted cylindrical bladed rotor 2 and a pair of guide walls 3, 4 interconnected by parallel end walls 5, 6, all these walls 3, 4, 5, 6 being held spaced from the interior of the casing. The casing 1 has end walls 7, 8, and top and bottom walls 9, 10, a vertical left hand wall 11 (as viewed in FIGURES 1 and 2) and an upwardly and outwardly sloping right hand wall 12: a sloping wall portion 13 joins the lower edge of the wall 11 to the bottom wall 10, while the top wall 9 slopes down at the right hand side to join the upper edge of the wall 12: in any horizontal cross-section the casing has a rectangular outline. An air inlet 14 to the casing 1 is provided over adjacent areas of the side wall 11 and top wall 9 which lie opposite the rotor 2. An air outlet 15 is provided over an area of the side wall 12 opposite the rotor 2. Curved vanes 16, 17 extend longitudinally across inlet and outlet 14, 15 to prevent manual contact respectively with the rotor 2 and with heater means to be described.

The casing 1 provides on the inside of the end wall 7 an inwardly-opening recess 18 snugly receiving and locating a fractional horsepower electric motor 19 the shaft 20 of which supports one end of the rotor 2 and drives it in the direction of the arrow 21. At the bottom of the recess 18 the end wall 7 is perforated at 22 for access of cooling air to the motor 19.

The guide wall 3, 4 which extend the length of the rotor 2, each have a main guide portion 25, 26 and an outlet guide portion 27, 28. The main guide portions 25, 26 of the guide walls face each other across the rotor 2 and are spaced therefrom an appreciable distance at their lines of nearest approach thereto, designated 30, 31 which define a nearly 180° arc of air entry to the rotor. In the example shown, the main guide portion 25 converges with the rotor in the direction of rotor rotation shown by the arrow 21. The outlet guide portions 27, 28 of the guide walls 3, 4 are straight and diverge in the direction of flow to form a diffuser 32, discharging directly towards the outlet 15. The main guide and outlet portions 25, 27 of the guide wall 3 meet in a nose 33 and define thereat an angle of just over a right angle. The main guide and outlet portions 26, 28 of the wall 4 merge in a smooth surface diverging steadily from the line 31 of nearest approach to the rotor. The wall 3 includes a lead-in portion 34 guiding air to the rotor 2. The edges of the guide walls 3, 4 terminate in spaced relation to the casing 1 adjacent the inlet 14 and outlet 15.

In operation, the rotor 2 and guide walls 3, 4 cooperate to set up vortex having, adjacent the wall 3, a generally cylindrical core parallel to and eccentric of the rotor axis and interpenetrating the rotor blades. This vortex core is a rotating body of air and the outermost, and fastest, stream tube thereof is diagrammatically indicated at V in FIGURE 1. By reason of the vortex a flow of air is set up through the casing which passes from the inlet 14, twice through the path of the rotating blades of the rotor 2, through the diffuser 32 and out through the outlet 15. The vortex causes the air to travel through the rotor 2 along lines which are curved about the vortex core V, the greater part of the throughput being concentrated in the more strongly curved and faster flow lines adjacent the core. Thus because of the vortex the air is turned through the angle subtended at the rotor by the outlet 15 and that part of the inlet 14 through which the air chiefly passes, and this turning of the air is unaccompanied by the losses which would occur if it had been accomplished in bent ducting.

An electric heating element 36, comprising a plurality of resistance wires 37 held in castellated insulating supports 38, is mounted within the diffuser 32 between the guide walls 3 and 4. The wires 37 may be closer together adjacent the wall 3 where the flow is faster.

The guide wall 3 is, as already mentioned, spaced from the interior of the casing 1. The space 40 defined between the wall 3 and the casing enables air which has passed through the rotor 2 to return to the entry arc thereof, in case the inlet 14 or outlet 15 should be blocked. The inlet 14 extends over a part of this space 40, so that in normal operation there is always some air flow through it from the inlet 14 to the rotor. Within the space 40, and in the air flow just mentioned, there is mounted a thermostat 41 connected electrically with the heater element 36. By adjustment of the thermostat 41 the heater element 36 can be cut in and out as required to maintain a desired temperature in a room in which the fan heater is placed, and will be quick in responding to temperature change by reason of the air flow over it from the inlet 14 to the rotor 2. If the inlet 14 or outlet 15 is blocked while the heater element 36 is in circuit, the recirculating flow of heated air through the space 40 will immediately cause the thermostat 41 to cut out the heater element. This arrangement thus obviates the need for a separate safety switch to cut out the element 36 on overheating.

The connecting and supporting means for the rotor, with which the invention is more particularly concerned, is not shown in detail in FIGURES 1 and 2.

One form of such means is illustrated in FIGURE 3; parts shown in FIGURE 3 which are similar to those of FIGURES 1 and 2 are designated by the same reference numerals and will not need further description.

The rotor 2 comprises a series of blades 100 extending parallel to the rotor axis and arranged in a ring thereabout to define an unobstructed interior space, the blades 100 being mounted on rotor end members 101, 102 of sheet material and generally of disc formation. The driven rotor end member 101 is coupled to the shaft 20 of the drive motor 19 by connection means designated generally 103, and the end member 102 at the non-driven end of the rotor 2 is rotatably mounted from the stationary end wall 6 of the fan, here shown purely schematically.

The drive connection 103 comprises a coil spring 104 which at one end frictionally engages a collar 105 fast on the shaft 20 and effectively forming part of it, and which at the other end frictionally engages a stub 106 which is integral with the end member 101 and extends axially outwardly thereof. The end portion of the shaft 20 projects with substantial clearance into an axial recess 107 in the stub. The end of the shaft 20 is formed with a depression 108 and similar depression 109 is formed in the bottom of the recess 107. A ball bearing 110 is positioned between the end of the shaft 20 and the bottom of the recess 107: the ball bearing locates in the depressions 108, 109 under the influence of the spring 104 which is stressed to exert endwise tension between the shaft and the stub.

The driving connection 103 will be seen to provide for a limited degree of universal movement of the rotor axis relative to that of the shaft 20 without imposing braking stresses. At the same time axial and radial location of the rotor end member 101 is ensured with the aid of the ball bearing 110.

The non-driven end of the rotor of FIGURE 3 may be flexibly supported as shown to the left of the figure.

The rotor end member 102 has an integral axially apertured central boss 151. A stub shaft 152 is rotatably mounted in the fixed support 6 by means of a metal bearing bushing 154 which journals the stub shaft and is surrounded by a rubber sleeve 155, the bushing 154 and sleeve 155 being received within a hollow boss 156 on the support part. The arrangement provides a support for the non-driven end of the rotor which is unaffected by slight misalignment of the rotor shaft. Slight axial movement of the rotor relative to the support is permitted since to a limited extent the stub shaft 152 can float axially relative to the bearing bushing 154. The space 157 may be used on an oil reservoir and can be packed with oil-retaining material.

FIGURE 4 shows a further form of connection means according to the invention, designated generally 200. Parts similar to those described with reference to FIGURE 3 will be given the same reference numerals and will not need further description. The rotor end member 101 here carries an axially projecting metal stub 201 having the same diameter as the motor shaft, the stub having its root 201a secured in an integral hub 202 on the end member, as by moulding the end member out of plastics around the stub. Once again a coil spring 104 frictionally engages the stub 201 and the drive shaft 20 and is tensioned to urge them together. The stub 201 and drive shaft 20 are spaced apart by a disc 203 of for example tetrafluorethylene (a plastic material having anti-friction properties, sold under the trademark Teflon). The disc 203 is supported in position by the spring 104 but since it is not connected to the stub 201 or to the shaft 20 it in no way prevents or inhibits slight universal movement of the rotor axis relative to the drive shaft, as provided for by the flexibility of the spring, nor does it cause any braking torque to be set up upon the drive shaft when this movement takes place: since with the disc present there are free turns of the spring between the stub and drive shaft, flexibility is enhanced and this universal movement is facilitated. At the same time the disc 203 prevents direct contact between the stub 201 and drive shaft such as might give rise to squeaks or other undesirable noise, bearing in mind that the limited universal movement referred to will almost always occur to some degree in practice due to manufacturing tolerances.

The disc 203 may be made of rubber (which term here as elsewhere in this specification, is understood to include synthetic elastomers), or other hard wearing non-metallic material, instead of tetrafluorethylene.

The non-driven end of the rotor 2 of FIG. 4 may be flexibly supported in the manner shown to the left of the figure. The end wall 6, here assumed to be formed of sheet metal, grips a bearing bushing 204 in a tight push fit. The bearing bushing may be of antifriction metal or Teflon. The rotor end member 102, which is made of plastics, has a central hollow boss 205 receiving a soft rubber sleeve 206. A stub shaft 207 journalled in the bushing 204 is received and frictionally gripped by the rubber sleeve 206 which is held in compression between the shaft and the boss 205.

FIGURE 5 illustrates yet another form of connection means according to the invention, designated generally 210: once again parts similar to those of FIGURE 3 will be similarly designated. In this embodiment the stub 211 is formed integrally with the rotor end member 212, for example by moulding from plastics material, and the end member is dished inwardly of the rotor to accommodate the axial length of the stub and thereby reduce the overall axial dimensions. The coil spring 104 once again frictionally grips the drive shaft 20 and stub 211 and is tensioned to urge them into contact; however in this case no intermediate disc is provided since the plastics-to-metal contact is not likely to cause noise.

The non-driven end of the rotor 2 of FIG. 5 is flexibly supported with the aid of a fixed stub shaft 213 secured directly to the end wall 6. The rotor end member 102, which is inwardly dished, has a central boss 214 locating a soft rubber sleeve 215. The stub shaft 213 is received within a bearing bushing 216 which is frictionally gripped by the sleeve 215, this sleeve being tightly compressed between the bushing and the boss 214.

Yet another form of connection means according to the invention is shown in FIG. 6, and designated 220. Again the same reference numerals are used for similar parts. In this embodiment the rotor 2 has metal end members 101, 102. A metal stub shaft 201 is received to a boss 202 in the end member 101 and connected to the motor drive shaft 20 by means of a coil spring 104 embracing both the stub shaft and the motor drive shaft in a tight frictional grip. Depressions 221, 222 are formed in the adjacent ends of the stub shaft 201 and drive shaft 20 and a ball bearing 109 is positioned between the shaft ends; as in the FIG. 3 arrangement, the ball bearing locates in the depressions 221, 222 under the influence of tension in the spring 104.

The non-driven end of the rotor 2 of FIG. 6 may be supported for rotation by means of an arrangement similar to that of FIG. 3, except that in FIG. 6 the stub shaft 152 is not mounted directly on the rotor end member 102 but in a self-aligning bearing arrangement shown at 224. The stub shaft 152 is received in a central bore of a part-spherical member 225 of oil-filled porous sintered material, which has a limited degree of universal movement in a boss 226 on the rotor end member 102. The stub shaft 152 may be journalled in the member 225; in this case the bearing bushing 154 may be dispersed with and the shaft held by a rubber sleeve similar to that designated 155 but of such an internal diameter as to exert a frictional grip on the shaft. If desired, the self-aligning bearing may have an outer housing separate from but secured to the boss 226.

A further form of connecting means is shown in FIG. 7, and designated 230. The rotor 2 is here made of plastics and, as in the FIG. 4 embodiment a stub shaft 201 is embedded in a boss 202 in the rotor end member 101. Also as in FIG. 4, a spring 104 surrounds the stub shaft 201 and the drive shaft 20 in tight frictional engagement and is tensioned to urge the shaft together. The end of the stub shaft 201 is formed with a conical depression 231 of wide vertical angle. The adjacent end of the motor shaft 20 is formed with a conical projection 232 of narrow vertical angle. Due to the tension in the spring 104 the projection is always seated firmly in the bore of the depression 231, so as to provide radial and axial location for the rotor end member 101; due to the difference in the cone angles, the projection 232 remains seated in the depression 231 despite minor universal movement of the drive shaft and rotor axes.

It will be understood that if desired the projection 232 can be formed on the stub shaft 201 and the depression 231 in the motor drive shaft.

The non-driven end of the rotor 2 of FIG. 7 is supported by means of a conical pin 233 mounted on the end of a spring blade 234 and resiliently hinged thereby into a conical recess 235 in an insert 236 centrally located in the rotor end member 102. The cone angle of the recess 235 is substantially greater than that of the pin. The insert can be metallic, or of Teflon.

It will be seen that the invention provides a connection means using parts which are simple to construct and assemble and which despite this simplicity provides for the desired limited universal movement between the rotor axis and the drive shaft without imposition thereon of appreciable braking torque, while also providing axial and radial location of the rotor end member relative to the drive shaft.

It is to be understood that various features of the different connection means here described by way of example may be combined differently: thus the rotor end member of FIGURE 3 or FIGURE 4 may be dished inwardly as in FIGURE 5.

Features of certain of the figures can also be combined. Thus in general the non-driven rotor end support means can be chosen from any of those illustrated, for any preferred form of drive connection. It is to be understood that invention resides also in the support means shown for the non-driven end of the rotor.

I claim:

1. A cross-flow machine comprising support means, a drive shaft on the support means, flexible bearing means on the support means in substantial axial alignment with the drive shaft, a bladed cylindrical rotor having one end mounted on the drive shaft and the other end rotatably supported on said bearing means, connection means interposed between said drive shaft and said one end of the rotor and effective to provide both support therefor and drive thereto, said connection means comprising a stub extending axially from said one end of the rotor and a coil spring frictionally embracing both the stub and the drive shaft and guide means cooperating with the rotor on rotation thereof by the drive shaft in a predetermined direction to induce a flow of air from one side of the rotor through the path of the rotating blades to the interior of the rotor and thence again through the path of the rotating blades to another side of the rotor.

2. A machine as claimed in claim 1, wherein a non-metallic disc is interposed between the ends of the stub and drive shaft, and supported by the spring.

3. A machine as claimed in claim 2, wherein the disc is of tetrafluorethylene.

4. A machine as claimed in claim 2, wherein the disc is rubber-ike.

5. A machine as claimed in claim 1, wherein the stub is recessed to receive the end of the drive shaft and a ball is located between the bottom of the recess and the end of the drive shaft, the stub and shaft being urged towards one another by the spring to grip said ball.

6. A machine as claimed in claim 1, wherein the stub is carried by a rotor end member which is inwardly dished to accommodate at least part of the axial length of the stub.

7. A machine as claimed in claim 1, wherein the stub is carried by a rotor end member and is integral therewith.

8. A machine as claimed in claim 1, wherein the adjacent end of the stub and the drive shaft are formed with depressions and a ball is located between the stub and drive shaft in said depressions, the spring urging said stub and drive shaft together about the ball.

9. A machine as claimed in claim 1, wherein one of said stub and drive shaft is formed with a recess and the other has a projection located in the recess, the spring being tensioned to urge the projection into engagement with the recess said engagement providing axial and radial location of the stub relative to the drive shaft with play for limited universal movement of the rotor and drive shaft.

10. A cross-flow machine comprising support means, a drive shaft on the support means, flexible bearing means on the support means in substantial axial alignment with the drive shaft, a bladed cylindrical rotor having one end mounted on the drive shaft and the other end rotatably supported on said bearing means, connection means interposed between said drive shaft and said one end of the rotor and effective to provide both support therefor and drive thereto, said connection means comprising a stub shaft extending axially from said one end of the rotor, one shaft having a recess in one end and the other shaft having a projection extending and being located by the recess with play for limited universal movement of said shafts, and a coil spring frictionally embracing both the stub shaft and the drive shaft and being tensioned to urge the projection into the recess, and guide means cooperating with the rotor on rotation thereof by the drive shaft in a predetermined direction to induce a flow of air from one side of the rotor through the path of the rotating blades to the interior of the rotor and thence again through the path of the rotating blades to another side of the rotor.

11. A machine as claimed in claim 10, wherein the recess is conical and the projection is also conical, the vertical angle of the recess being substantially greater than that of the projection.

References Cited by the Examiner
UNITED STATES PATENTS

| | | | |
|---|---|---|---|
| Re. 25,365 | 4/1963 | Eck | 230—125 |
| 1,684,773 | 9/1928 | Marks | 103—111 |
| 1,886,513 | 11/1932 | Anderson | 230—125 |

SAMUEL LEVINE, *Primary Examiner.*